United States Patent [19]

Simpson et al.

[11] Patent Number: 4,795,567
[45] Date of Patent: Jan. 3, 1989

[54] OIL SPILL SEPARATING AND RECOVERY SYSTEM

[75] Inventors: Scott O. Simpson; Ellis O. Simpson, both of Port Neches, Tex.

[73] Assignee: Tricil Environmental Response, Inc., Port Neches, Tex.

[21] Appl. No.: 500,132

[22] Filed: Jun. 1, 1983

[51] Int. Cl.$^4$ .......................... C02F 1/40; E02B 15/04
[52] U.S. Cl. .................... 210/744; 210/242.3; 210/416.1; 210/540; 210/776; 210/923
[58] Field of Search ...................... 210/744, 776, 242.3, 210/923, 416.1, 538, 540

[56] References Cited

U.S. PATENT DOCUMENTS

| | | | |
|---|---|---|---|
| 3,690,464 | 9/1972 | Heinicke | 210/923 |
| 3,957,646 | 5/1976 | Wickert | 210/776 |
| 3,966,614 | 6/1976 | Ayers | 210/776 |
| 4,006,086 | 2/1977 | Tsunoi | 210/776 |
| 4,182,679 | 1/1980 | Hekle | 210/242.3 |

Primary Examiner—Richard V. Fisher
Attorney, Agent, or Firm—Fleit, Jacobson, Cohn & Price

[57] ABSTRACT

Vacuum pressure applied to a hydrostatic chamber causes a rise of carrier liquid from an underlying flow stream to an equilibrium level in a hydrostatic column passage and stacking of floating liquid thereabove for separation from the carrier liquid by overflow into siphoning passages conducting the floating liquid to a recovery container vented to atmosphere. The liquid conducted through the siphoning passages seals the hydrostatic chamber, within which an adjusted vacuum pressure maintains recovery operation under established hydrostatic relationships for a given set of dynamic flow conditions.

20 Claims, 6 Drawing Sheets

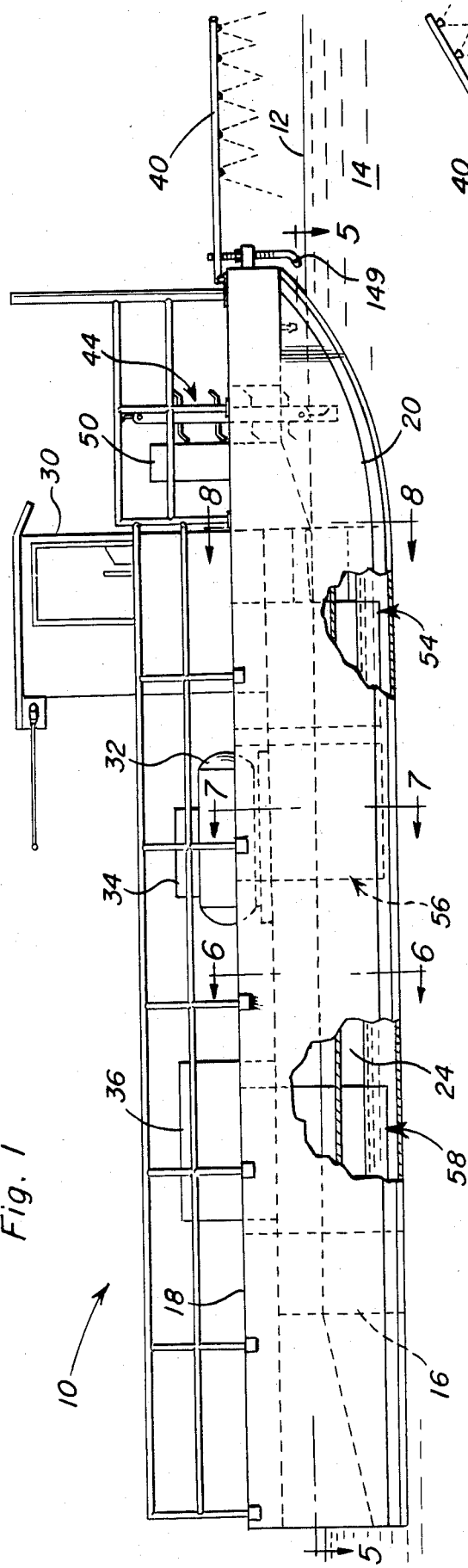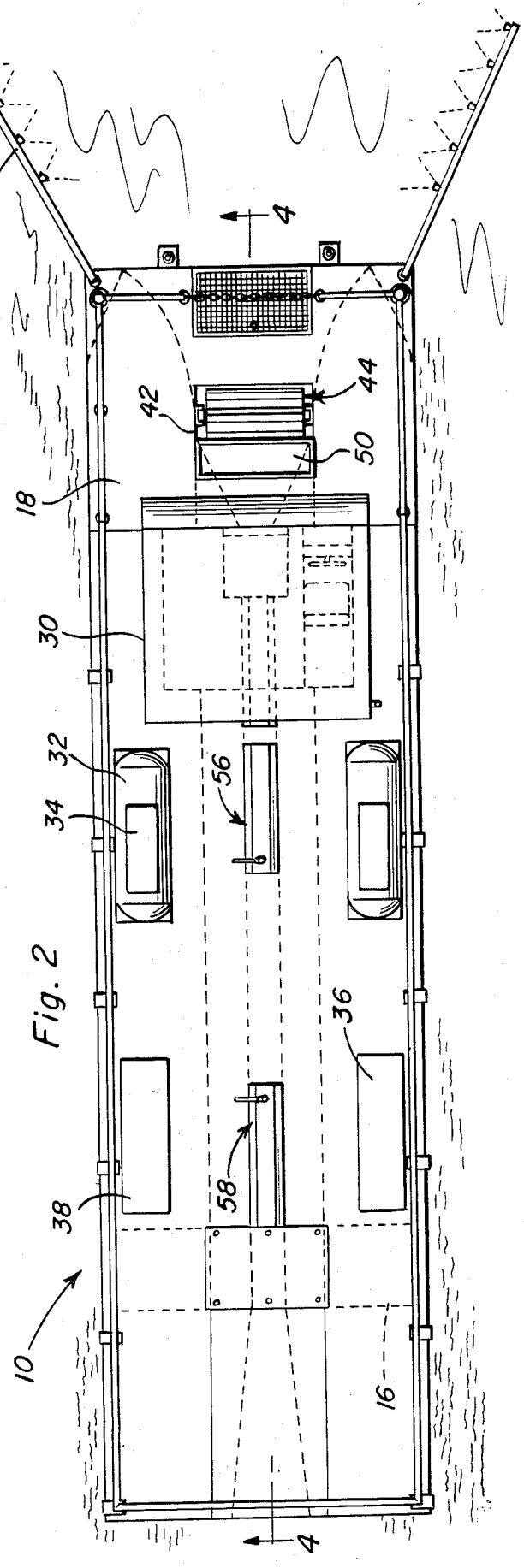
Fig. 1
Fig. 2

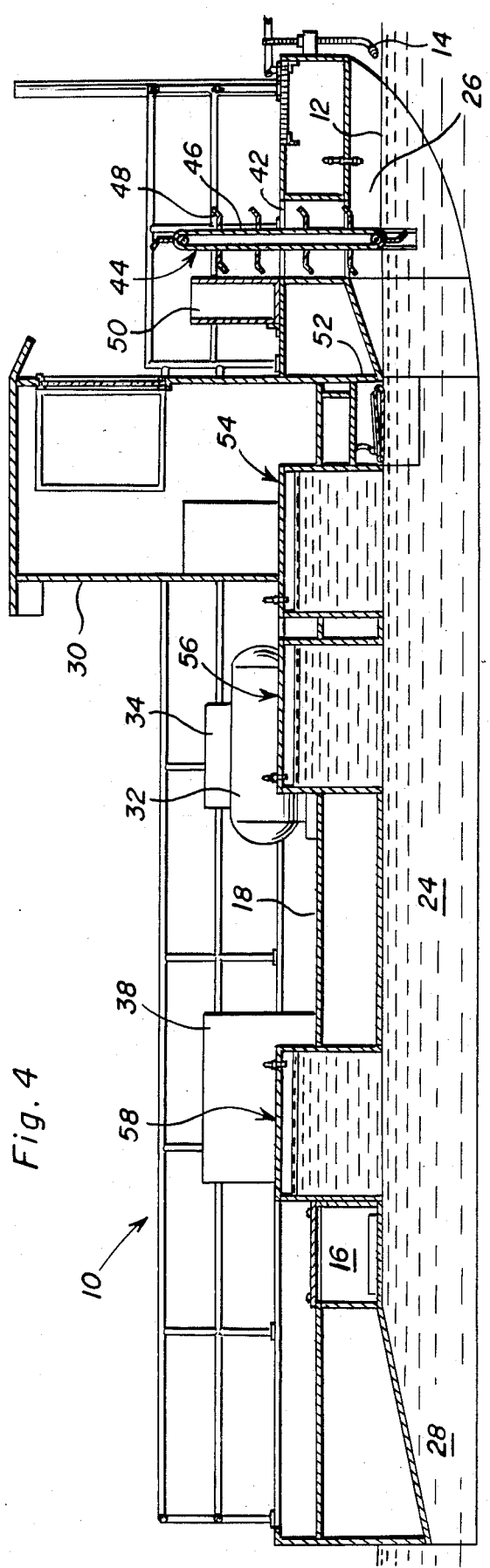
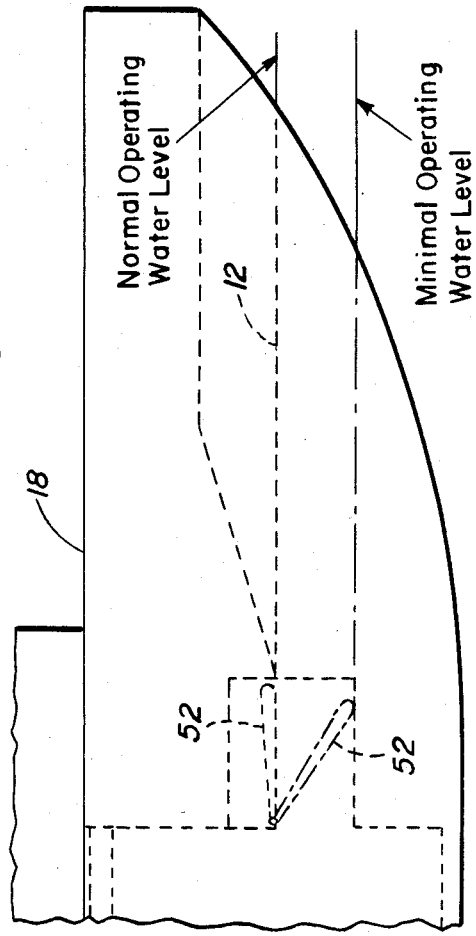
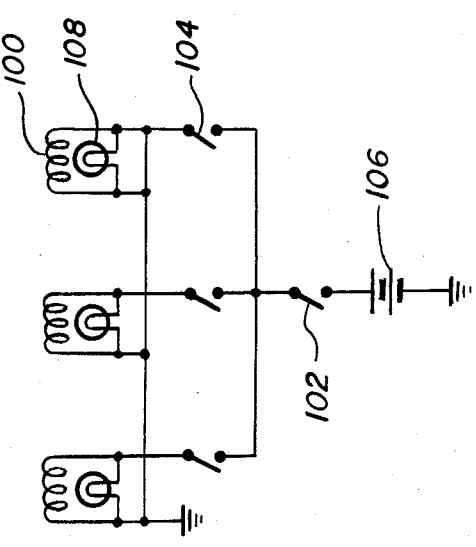

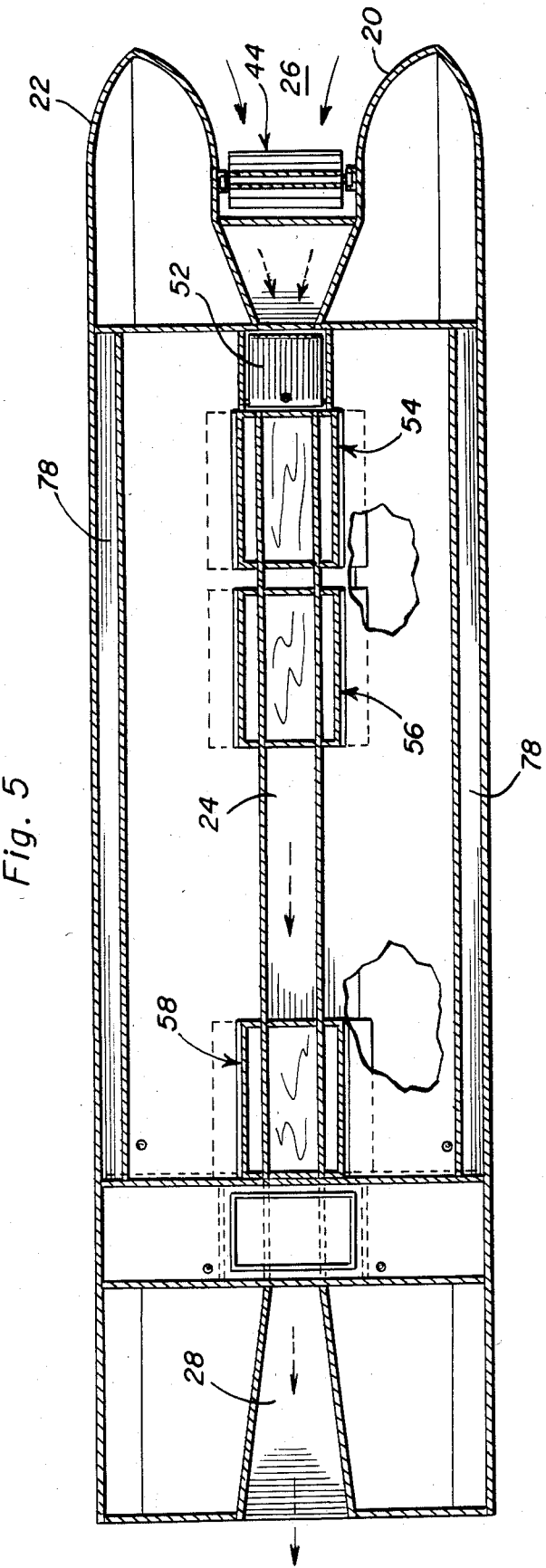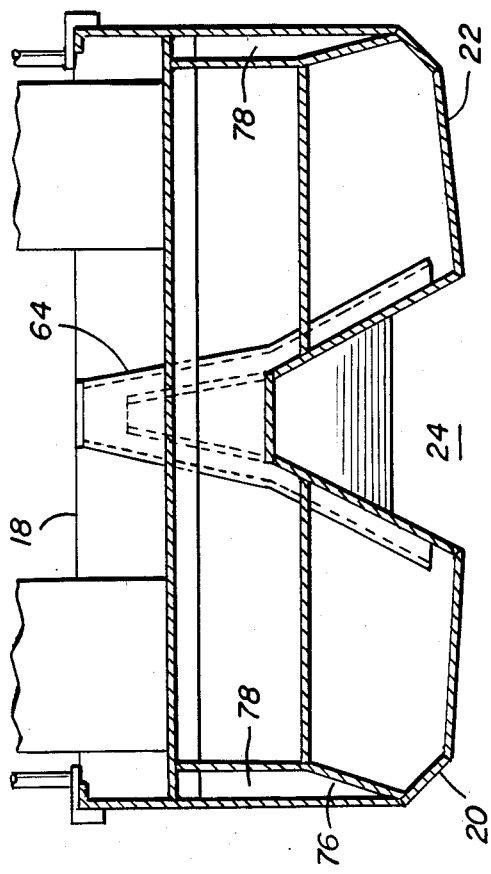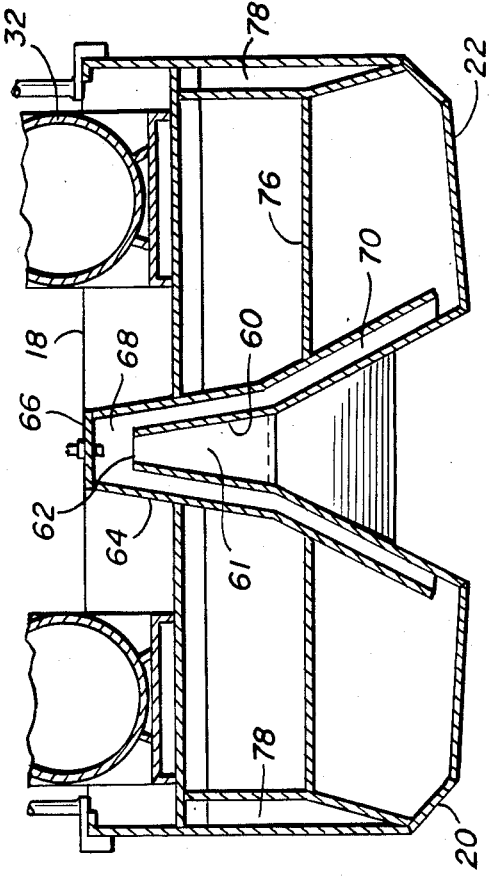

OIL SPILL SEPARATING AND RECOVERY SYSTEM

BACKGROUND OF THE INVENTION

This invention relates generally to the separation and recovery of liquid products from more dense liquid carriers including but not necessarily limited to the retrieval of oil, chemicals and other such environmental pollutants floating on water surfaces.

Methods and apparatus for retrieval of floating materials, such as spilled oil, on the surface of water bodies, are of course well known, including the use of vacuum pressure in the retrieval process. Vacuum pressure has been used, for example, to induce air flow for entraining an oil slick, to maintain oil bodies under continuous suction, to induce a whirlpool action and to displace water for siphoning purposes. Such prior oil spill retrieving systems suffer from many drawbacks including a lack of installational flexibility, erratic operation and efficiency, and a lack of cost effectiveness.

It is therefore an important object of the present invention to provide a system adaptable to a variety of environmental and industrial demands associated, for example, with spills, outfall cleanup, and liquid recovery for reprocessing purposes.

Additional objects of the present invention include the provision of a system for retrieving floating liquids from the surface of liquid carriers which avoids the aforementioned drawbacks of prior systems including operational instability that often occurs in connection with the use of such systems on marine vessels during rough sea conditions.

SUMMARY OF THE INVENTION

In accordance with the present invention, a floating liquid is recovered from a liquid carrier in a flow stream underlying one or more recovery stages having vacuum separation chambers through which the floating liquid may be removed in sequence. Each separation chamber exposes the flow stream to vacuum pressure through a hydrostatic liquid column passage into which the carrier liquid rises to form a liquid column. The floating liquid stacks above such liquid column until it overflows into siphoning passages conducting the spill over into recovery tanks. The spill over is accordingly collected in such tanks whihh are vented to atmosphere but are isolated from the separation chambers by the sealing action of the liquid in the siphoning passages. By adjssting the vacuum pressure, the carrier liquid is maintained depressed by the stacking liquid at an optimum equilibrium column level below an upper weir end of the column passage from which the floating liquid spills over into the siphoning passages. Thus, as long as a significant quantity of floating liquid is carried in the underlying flow stream being processed, an overflow level of the floating liquid is maintained in the vacuum separation chamber above the weir end of the column passage to establish the necessary hydrostatic and dynamic relationships for continued operation of the system.

In a marine vessel installation for the system, the hydrostatic relationships necessary for continued operation require the maintenance of a constant operating water level for the hull of the vessel which would ordinarily vary as floating liquid is accumulated in the recovery tanks to increase the loading of the vessel. Accordingly, the quantity of liquid stored in vessel ballast tanks is decreased correspondingly by us of level sensing controls. Further, the carrier liquid has solid matter or debris removed therefrom before it enters a recovery processing channel underlying one or more recovery stages. Also, during such entry into the processing channel, the surface floating liquid is held down by a pivotal bladder to prevent its displacement from the flow stream. Such forcing of the floating liquid or oil into the processing channel and the stacking effect aforementioned within the recovery stages is responsible for maximum efficiency and operational stability under rough offshore sea conditions. Facilities for adjusting the vacuum pressures applied to each of the stages and for controlling the liquid level in the recovery and ballast tanks enables the establishment and maintenance of the hydrostatic relationships necessary for continuous recovery operation under prevailing dynamic flow conditions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a side elevational view of a typical marine vessel on which the system of the present invention is installed.

FIG. 2 is a top plan view of the vessel shown in FIG. 1.

FIG. 4 is a side sectional view taken substantially through a Plane indicated by section line 4—4 in FIG. 2.

FIG. 5 is a top sectional view taken substatially through a plane indicated by section line 5—5 in FIG. 1.

Figure 3:
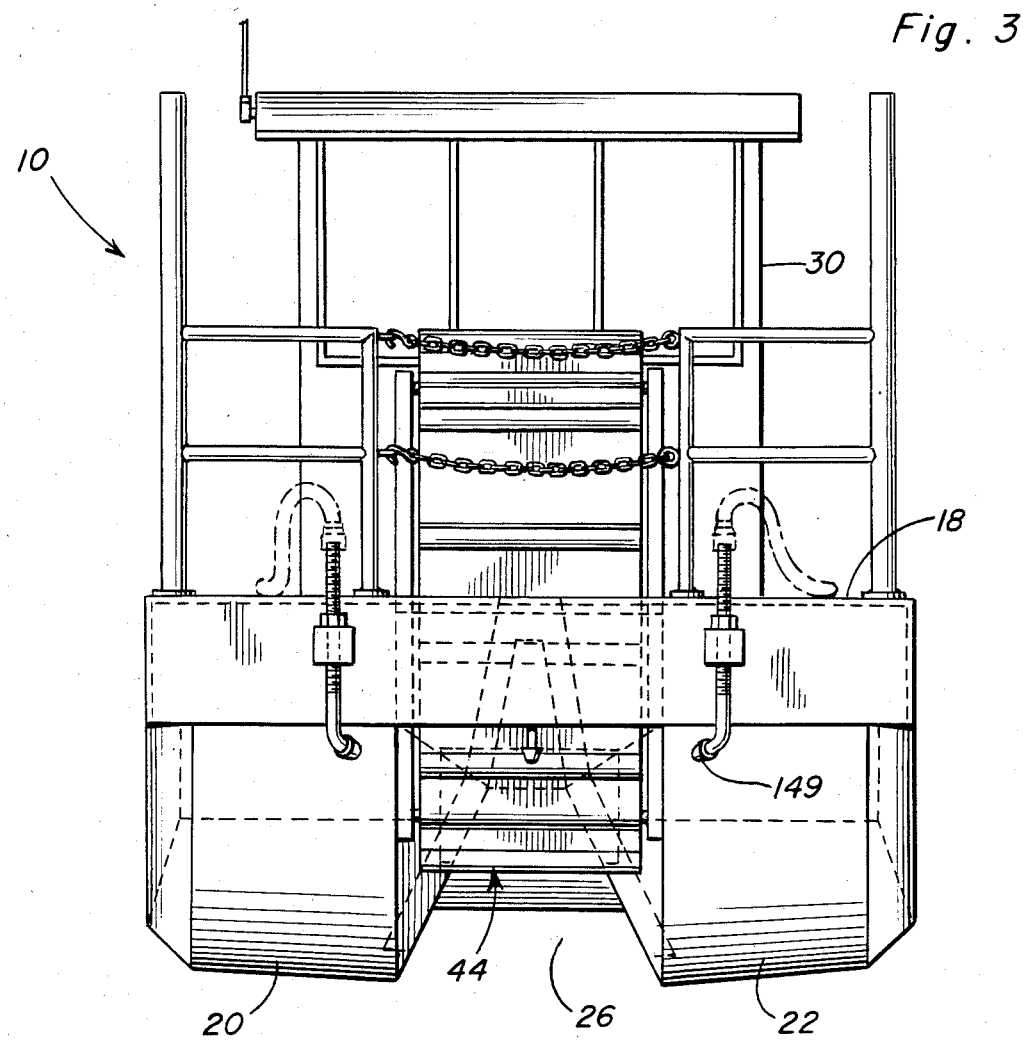
FIG. 3 is a front elevational view of the vessel shown in FIGS. 1 and 2.
Figure 8:
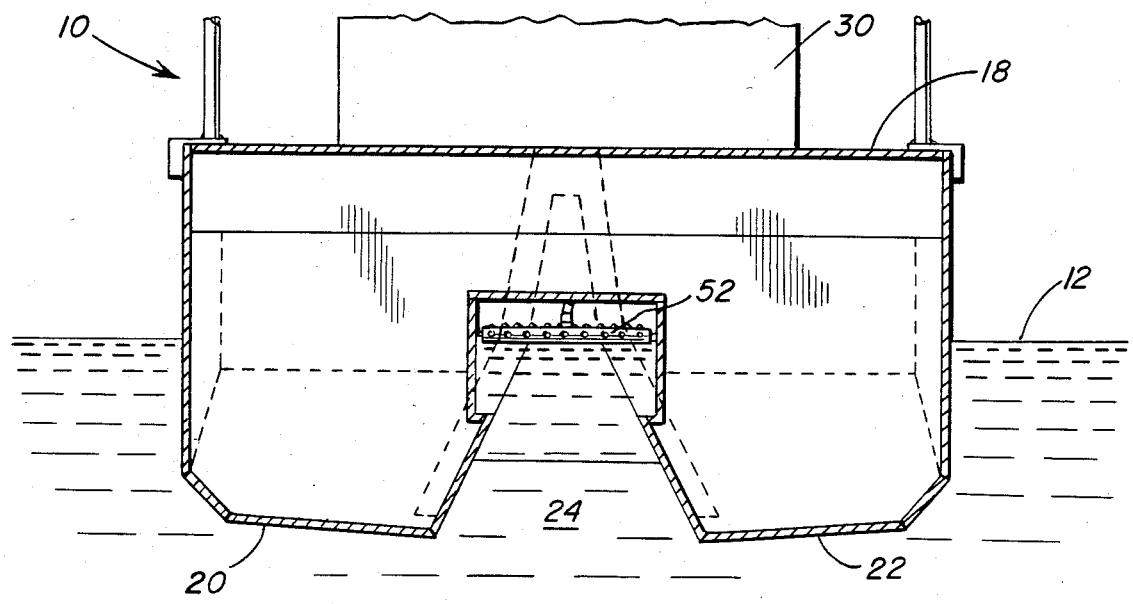

FIGS. 6, 7 and 8 are partial transverse sectional views taken substantially through planes indicated by section lines 6—6, 7—7 and 8—8 in FIG. 1.

FIG. 9 is a partial side elevational view of the bow end portion of the vessel.

Figure 10:
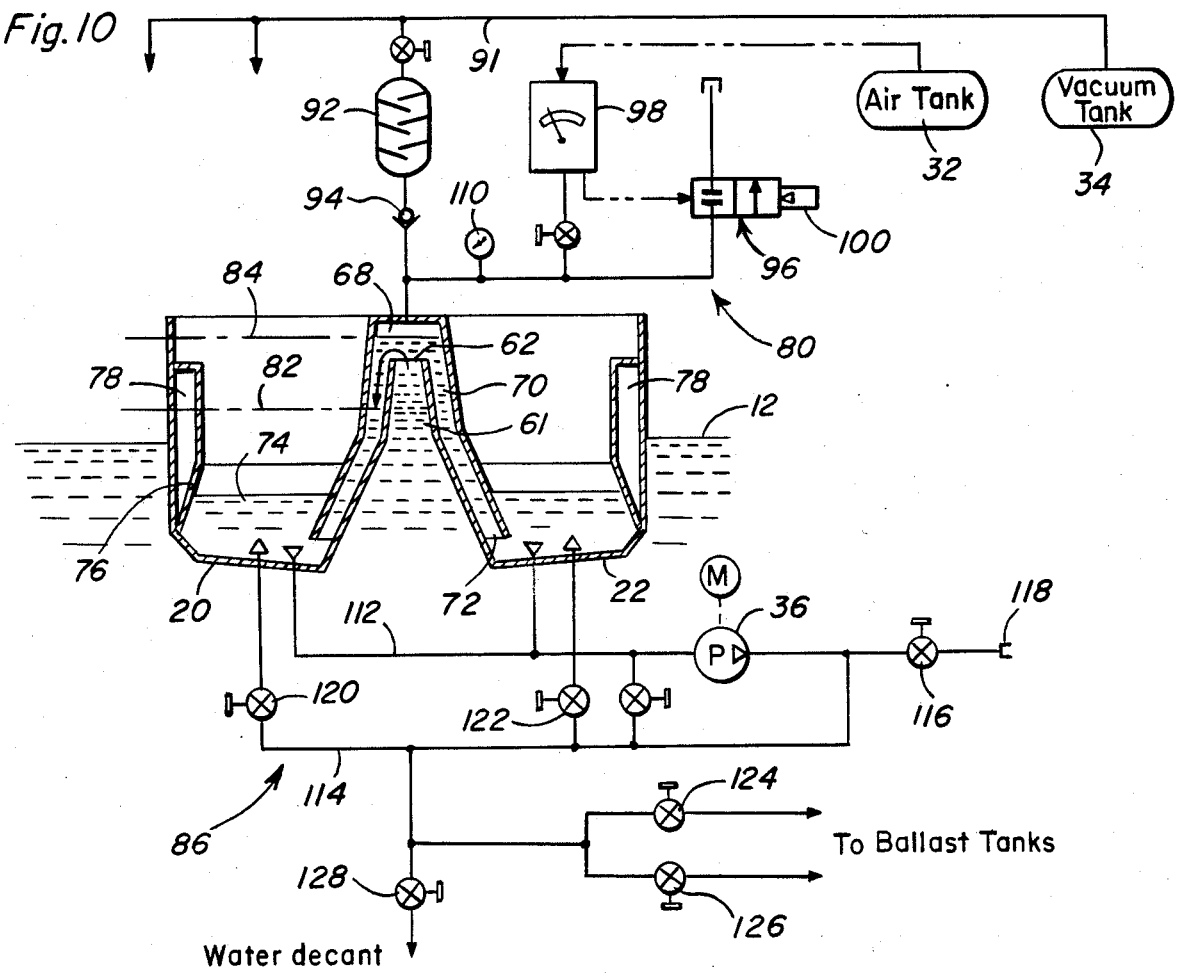

FIG. 10 is a schematic view and fluid circuit diagram showing operational controls associated with the system of the present invention.

FIG. 11 is an electrical circuit diagram associated with the controls shown in FIG. 10.

Figure 12:
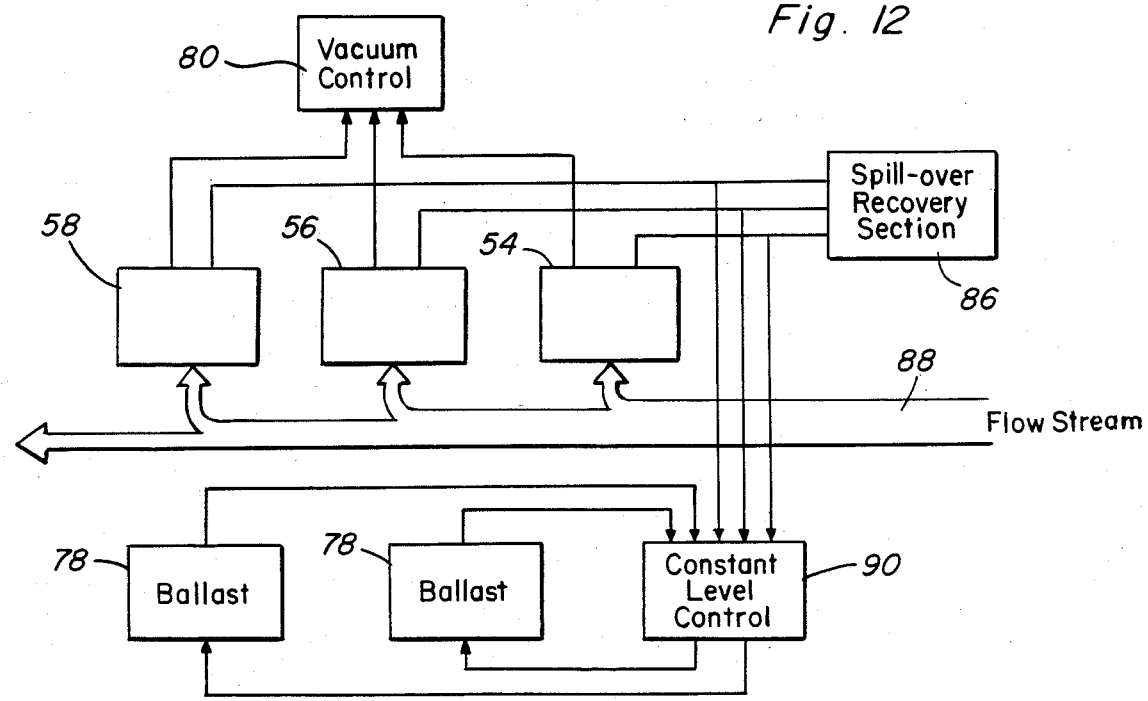

FIG. 12 is a block diagram depicting the system.

Figure 13:
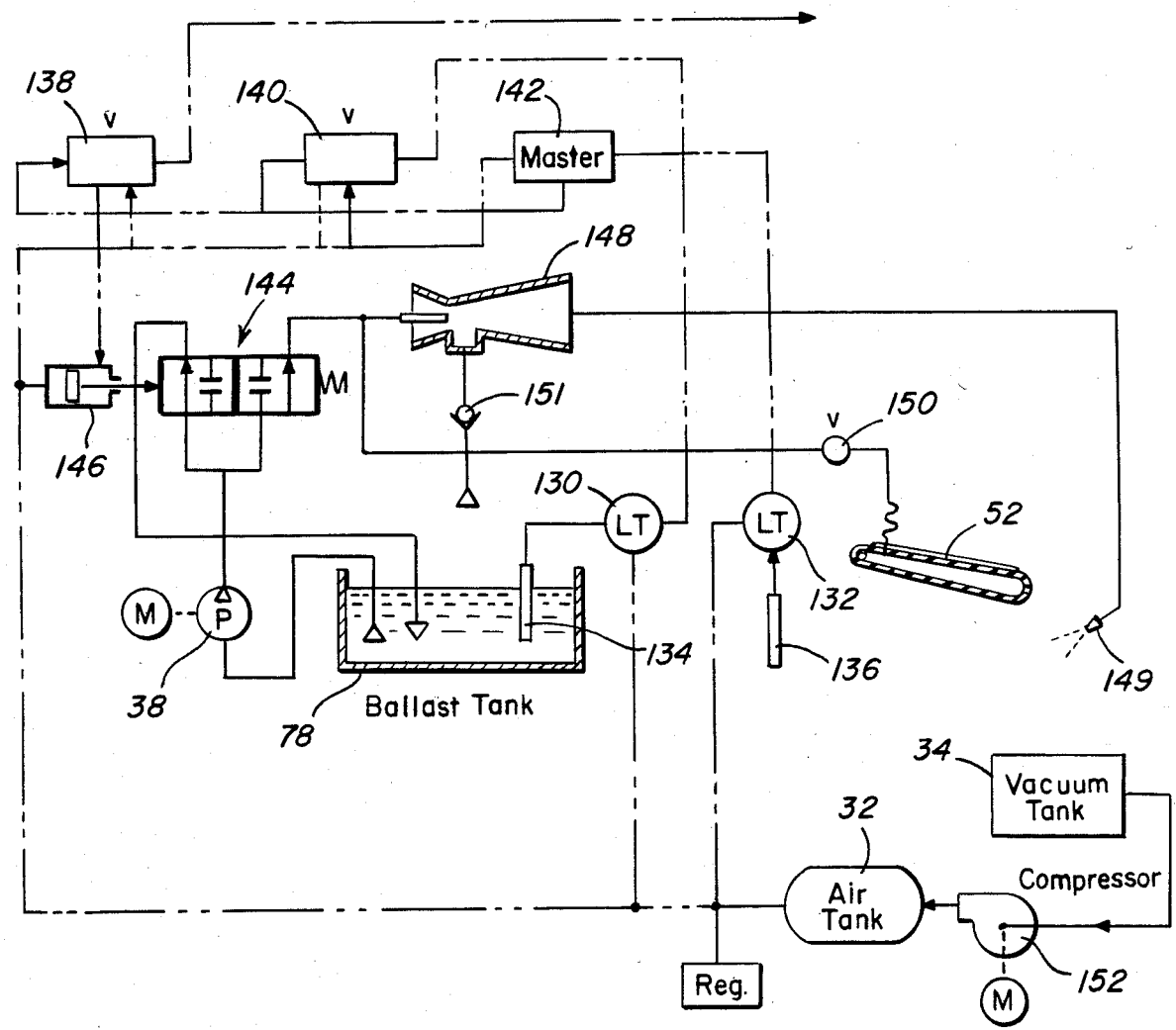
Figure 14:
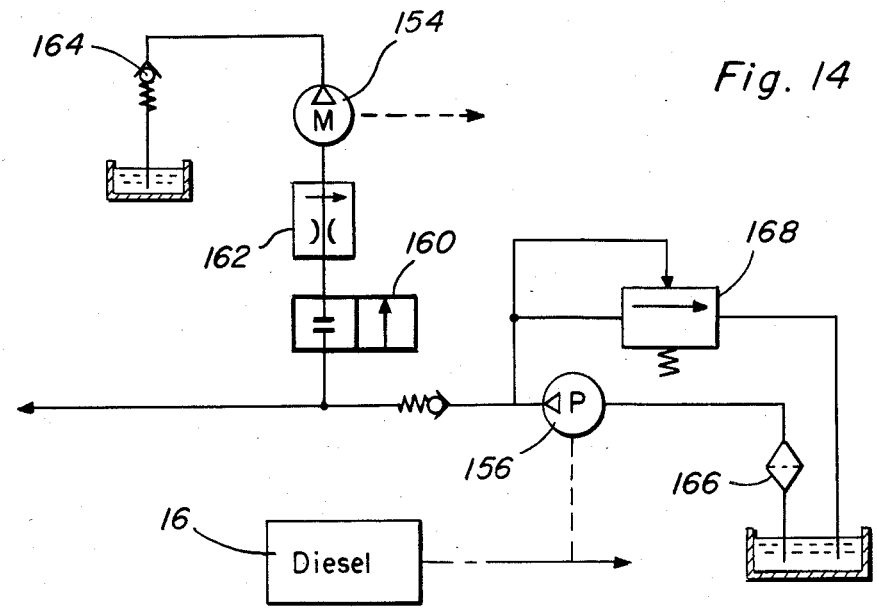

FIGS. 13 and 14 are fluid circuit diagrams showing other controls associated with the system.

DETAILED DESCRIPTION OF PREFERRED EMBODIMENT

Referring now to the drawings in detail, FIGS. 1-8 illustrate a typical marine vessel, generally referred to by reference numeral 10, with which the present invention may be associated in accordance with one embodiment for the purpose of removing and recovering oil, chemiclls, and other environmental pollutants floating on the surfac 12 of a body of water 14 such as a lake, river, bay or ocean. In the embodiment illustrated, the vessel 10 has diesel engines 16 to provide power for propulsion in any suitable manner well known in the art as well as to provide a source of energy to operate an oil spill recovery system to be described hereinafter.

The vessel 10 features a top deck 18 interconnecting laterally spaced hull sections 20 and 22 between which a flow through channel 24 is formed extending from an intake portion 26 at the bow end of the vessel to a discharge portion 28 at the stern end. As more clearly in FIG. 5, the intake and discharge end portions respectively converge in aft and forward directions toward a narrower intermediate portion of the channel within which the water is exposed to the oil spill recovery system, the operation of which is controlled and monitored from the control house 30 on the deck 18. Various above-deck mounted components of the system include air tanks 32, vacuum tanks 34, an oil pump 36 and a ballast pump 38 as more clearly seen in FIGS. 2 and 3.

In order to augment the intake of surface polluted water into the vessel in response to its forward propulsoon, a pair of removable sprayer beams 40 may be provided to discharge liquid onto the surface 12 of the water forwardly of the vessel. An opening 42 is formed in the deck adjacent the bow end of the vessel, as shown in FIGS. 2 and 4 through which a motor driven debris removing device 44 extends vertically above the deck from a bottom end submerged within the flow stream entering the intake portion 26 of the flow channel. The device 44 as shown includes an endless belt 46 from which screen elements 48 extend to entrap solid debris and carry it up above deck for deposit within a catch basin 50. The water surface is therefore free of solid matter capable of damaging and/or adversely affecting recovery of floating liquid products within the intermediate oil recovery portion of the flow-through channel 24. In order to insure entry of surface floating oil or other liquids of lower density hhan the water, a flexible inflated bladder 52 is pivotally mounted at the convergent end of intake portion 26 as more clearly seen in FIGS. 4, 5, 8 and 9. The bladder 52 pivots so as to accommodate changes in water operating level relative to the vessel and floats on the water surface so as to maintain a hodding pressure on the oil as it is carried by the flow stream into the oil recovery portion of channel 24.

In the illustrated embodiment, oil is recovered from channel 24 in three sequential and repetitious stages respectively denoted by reference numerals 54, 56 and 58, each recovery stage being of similar construction and operation. Surface floating liquids are thereby progressively removed from the water in the flow stream which emerges substantially free of pollutants from the discarge end portion 28 of the channel 24 underlying the three stages. As more clearly seen in FIG. 6, each stage includes upwardly convergent walls 60 forming a hydrostatic liquid column passage 61 terminating at an upper weir end 62 above the operating water level of surface 12 within the vessel and below deck 18. The column passage walls 60 may be formed as extensions of the sides of the flow through channel between the hull sections 20 and 22 and are enclosed between downwardly diverging sidewalls 64 interconnected at an upper end by a closing end wall 66 spaced above the upper weir end 62. A hydrostatic vacuum zone or chamber 68 is formed vertically between end wall 66 and the weir 62 in fluid communication with siphoning flow passages 70 formed between the walls 64 and 60. The siphoning passages terminate at lower ends 72 below the level 74 of spill over oil collected within recovery tanks or containers 76 into which the walls 64 extend. The oil recovery tanks 76 are disposed within both hull sections 20 and 22 and serve all stages in common by extending parallel to the oil recovery portion of channel 24 on opposite sides thereof. Also, ballast tanks 78 are formed within each of the hull sections as shown in FIGS. 6 and 7. The ballast tanks extend vertically from the bottom of the hull sections 20 and 22 to the top deck 18, and are utilized to maintain a constant operating water level that would otherwise change as oil is collected in the recovery tanks 76. The change in oil level in the recovery tanks is limited between a minimum level limit above the lower ends 72 of the siphoning passages 70 and a maximum level limit below the operating water level o surface 12. Further, the tanks 76 are open to atmosphere as compared to the pressure sealed chambers 68 isolated from the tanks 76 by the sealing action of liquid or oil within the siphoning passages 70. The oil reaches the siphoning passages 70 as spill over from the upper weir end 62 of the liquid column walls 60, as will be explained in greater detail hereinafter with reference to FIG. 12.

Vacuum pressure applied to chamber 68 is effective to cause a rise of carrier liquid or water from the underlying flow stream in channel 24 into the liquid column passage 61. The vacuum is adjusted through a vacuum control circuit 80 to establish a hydrostatic water column up to an equilibrium level 82 below the upper weir end 62 of the column passage 61 and above the operating water level at 12 as shown in FIG. 10. The oil floating on the water will therefore separate and stack above level 82 within an oil column up to an overflow level 84 within chamber 68. Such stacking of oil depresses the water level 82 in column passage 61. Level 82 will therefore rise as oil is depleted from the flow stream as the overflow level 84 drops under prevailing dynamic flow conditions which determine the flow rate of spill over oil in the siphoning passages 70 and the inflow rate of oil from the flow stream in channel 24. The overflow level 84 may vary within acceptalle limits above weir 62 to maintain operation of the system once the vacuum pressure in the vacuum air zone of chamber 68 is adjusted to establish an optimum equilibrium water column level 82. Also, to maintain recovery operation, the level of the spill-over oil collected in the recovery tanks 76 must be maintained between operatin limits as aforementioned. Toward that end, an oil eecovery control circuit 86 is provided as diagrammed in FIG. 12. When the quantity of floating oil being retrieved is sufficiently depleted in the flow stream being processed, the overflow level 84 will drop below the weir 62 causing recovery operation to stop.

FIG. 11 summarizes the processing of liquids of different densities within a carrier flow stream 88, such as the water and oil hereinbefore referred to. Portions of the lower density liquid or oil are sequentially removed from the carrier liquid in the recovery stages 54, 56 and 58 as diagrammed, under vacuum pressure adjusted through control section 80. The stages are maintained in operation by the spill-over recovery control section 86 and a level control section 90 which varies the quantity of liquid in the ballast tanks 78 to maintain the necessary relationship between water operation level and hydrostatic liquid column level, despite the increasing quantity of spill-over oil being collected within the recovery tanks 76 of the vessel.

Referring now to the vacuum control section 80 diagrammed in FIG. 10, the vacuum pressure in the tanks 34 are applied to each stage through a vacuum pressure line 91. Each separation chamber 68 is connected to line 91 by a vacuum separator 92 and check valve 94. Vacuum pressure in line 91 is maintained in chamber 68 upon closing of a vent valve 96 under joint control of a controller 98, to which compressed air is supplied from air tank 32, and a shut-down solenoid valve actuator 100. Energization of the solenoid 100 will accordingly open vnnt valve 96 to effect shut down of its associated stage by atmospheric venting of separation chamber 68. Such shut-down energization of the solenoids 100 of each stage is effected by closing of a master shut-down switch 102 and a stage shut-down switch 104 as diagrmamed in FIG. 11. The stage switches 104 are connected in parallel to the master shut-down switch 102 for series connections between a source of voltage 106 and the solenoids 100. An indicator lamp 108 is connected across the terminals of each solenoid to indicate the operating or non-operating condition of each stage. Such indicators 108 and vacuum pressure gauges 110 as shown in FIG. 10, are mounted in the control house 30 for monitoring and control purposes.

The spill-over control section 86 also diagrammed in FIG. 10, includes a suction line 112 connecting the two recovery tanks 76 to the suction port of the oil pump 36. The pressure outlet port of pump 36 is connected to an oil transfer line 114 and through an oil removal valve 116 to a hose coupling 118 through which the oil recovery tanks are unloaded at some receiving dock or terminal. The transfer line 114 is also connected through valves 120 and 122 to the oil tanks 76 for transfer of oil between tanks and through valves 124 and 126 to the ballast tanks. Water is decanted from the oil tanks through valve 128.

The ballast control section 90 diagrammed in FIG. 13 shows the air tank 32 from which compressed air is supplied to signal transmitters 130 and 132 of the fluidic type. Transmitters 130 are connected to level sensors 134 in each of the ballast tnnks 78 while transmitter 132 is connected to an operating water level sensor 136 for the vessel. The transmmitters 130 accordingly supply air level signals to fuuidic controllers 138 and 140 jointly controlled by the output of a master fluidic controller 142 to which a signal input is applied from transmitter 132. Accordingly, the signal outputs of controller 138 and 140 will depend on the levels sensed in the ballast tanks and the water operating level to control valve 144 through actuator 146 for each ballast tank 78. In one operative position of valve 144 as shown in FIG. 13, the output of the ballast pump 38 recirculates liquid in the ballast tank. In the other position of valve 144, the pump 38 draws liquid from the ballast tank for discharge into a jet pump 148, and through valve 150 effects inflation of the bladder 52. Operation of jet pump 148 by discharge of pump 38 induces recirculating flow of liquid from the flow stream through check valve 151 to discharge nozzles 149 at the bow end of the vessel.

The air tank 32 is charged by the pressure output of air compressor 152 which also maintains a vacuum pressure in the vacuum tank 34 as diagrammed in FIG. 13. Drive of each of the compressor 152, ballast pump 38, oil pump 36 and the debris removing device 44 is effected through a plurality of fluid motors 154, one of which is diagrammed in FIG. 14. Each motor 154 receives pressurized fluid from a pump 156 through check valve 158, control valve 160 and flow control 162. The motor discharges through check valve 164 to a sump from which the pump 156 draws the fluid through a filter 166. The pumps 156 are driven by the diesel engines 16 and their outputs are regulated by pressure regulators 168.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope o the invention.

What is claimed as new is as follows:

1. In a method of recovering floating material on a surface of a flow stream of liquid by exposure of said surface to a hydrostatic zone for separating the floating material from the liquid and collecting the separated floating material within a container, the improvement including the steps of: establishing fluid communication between the surface of the flow stream and the hydrostatic zone through a liquid column terminating at an upper end within said zone; applying a vacuum pressure to said zone causing liquid from the flow stream to rise within the column and the floating material to stack thereabove; adjusting said vacuum pressure to establish an equilibrium level of the liquid within the column causing overflow of the stacked floating material from said upper end of the column; and conducting said overflow into the container.

2. The method of claim 1 wherein collection of the overflow within the container is limited to a maximum level below the surface of the flow stream.

3. The method of claim 2 wherein the overflow is conducted to the container along paths establishing a liquid seal between the container and the hydrostatic zone.

4. The method of claim 3 wherein the hydrostatic zone is supported in a vessel floating on a body of said liquid, said flow stream being produced by relative movement between the vessel and the body of liquid.

5. The method of claim 3 wherein said liquid is water and the floating material is spilled oil.

6. The method of claim 1 wherein the overflow is conducted to the container along paths establishing a liquid seal between the container and the hydrostatic zone.

7. The method of claim 1 wherein the hydrostatic zone is supported in a vessel floating on a body of said liquid, said flow stream being produced by relative movement between the vessel and the body of liquid.

8. The method of claim 7 wherein said liquid is water and the floating material is spilled oil.

9. For use with a vessel floating on a body of water at a predetermined operating water level, said vessel having ballast means for maintaining said operating water level substantially constant and supporting a container within which products less dense than the water are collected, a method of separating and recovering said products from the water during movement of the vessel, including the steps of: establishing a hydrostatic zone above said operating water level; exposing the water to said hydrostatic zone above the operating water level; applying a vacuum pressure to said hydrostatic zone to elevate the water in a column to an equilibrium level; adjusting the vacuum pressure to cause overflow of products stacked on the column above said equilibrium level thereof into the container; and limiting collection of the overflow within the container to a maximum level below the operating water level.

10. In a method of separating liquids of different densities conducted by a flow stream in operative relation to a separation zone, the improvement including the steps of: exposing said flow stream through a dydrostatic liquid column to the separation zone; applying a vacuum pressure to the separation zone causing rise of the liquids into the hydrostatic column; and adjusting the vacuum pressure to establish an equilibrium level at which the liquids separate within the column causing overflow of only the liquid of lower density from the column.

11. The improvement as defined in claim 10 further including the step of: siphoning the overflow from the separation zone into a collection zone.

12. In a system for recovering material floating on a surface of water from a flow stream conducted in underlying relation to at least one recovery stage having a separation chamber, the improvement comprising hydrostatic column means for exposing the flow stream to said separation chamber, a source of vacuum pressure means operatively connecting said source to the separation chamber for causing rise of the water from the flow stream into the column means to an equilibrium level with the floating material stacked thereabove, means adjusting the vacuum pressure of said source for causing overflow of the stacked floating material above said equilibrium level into the separation chamber, and means for removing the overflow from the separation chamber to maintain a predetermined overflow level of the floating material within the separation chamber.

13. The system as defined in claim 12 wherein the separation chamber is mounted within a vessel floating on a body of water through which the vessel is propelled to produce said flow stream, ballast means mounted in the vessel for maintaining an operating water level at which the vessel is floated in the body of water, and control means connected to the ballast means for maintaining the operating water level substantially constant during said removal of the overflow from the separation chamber.

14. The improvement as defined in claim 13 wherein said overflow removal means comprises a collection tank, siphoning passage means mounted in operative relation to the hydrostatic column means for establishing a liquid seal between the separation chamber and the collection tank, and means for limiting the maximum level on the floating material accumulated within the collection tank below the operating water level.

15. The system as defined in claim 14 including additional recovery stages to which the flow stream is exposed in sequence.

16. The improvement as defined in claim 12 wherein said overflow removal means comprises a collection tank, and siphoning passage means mounted in operative relation to the hydrostatic column means for establishing a liquid seal between the separation chamber and the collection tank.

17. The system as defined in claim 12 including additional recovery stages to which the flow stream is exposed in sequence.

18. A system for separating liquids of different densities within a flow stream conducted in operative relation to a hydrostatic chamber device, comprising passage means for establishing fluid communication between the hydrostatic chamber device and the flow stream, means applying vacuum pressure to the chamber device for causing rise of the liquids into the passage means to form separate liquid columns stacked above each other, the liquid of lowest density being stacked above an equilibrium level to form an uppermost one of the separate liquid columns, means connected to the vaccum pressure applying means for adjusting said equilibrium level to cause overflow of the liquid of lowest density from the passage means into the chamber device, and means for removing spill over of the liquid of lowest density from the chamber device at a rate maintaining a predetermined overflow level of the spill over within the chamber device above the passage means.

19. The system as defined in claim 18 wherein said spill over removing means comprises a collection tank, and siphoning means for conducting the spill over from the chamber device to the collection tank.

20. The system as defined in claim 19 wherein said siphoning means includes passages through which the spill over is conducted, and means establishing said passages in operative relation to the collection tank for sealing of the chamber device.

* * * * *